H. MAUSK.
HAND BRAKE MECHANISM.
APPLICATION FILED JULY 14, 1915.
1,155,328. Patented Sept. 28, 1915.
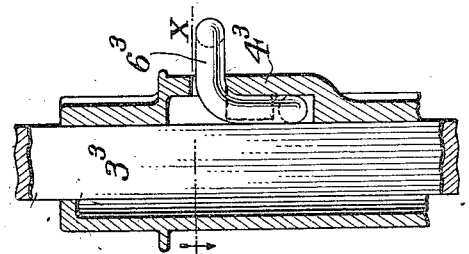
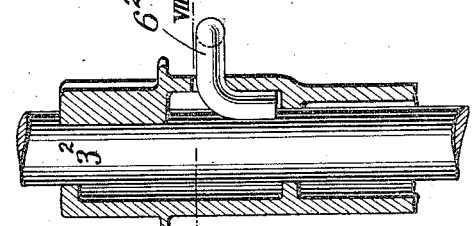
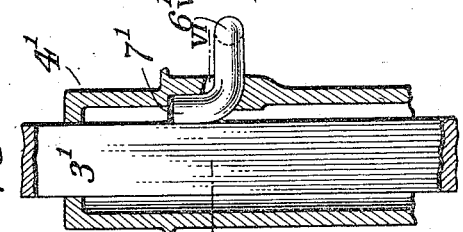
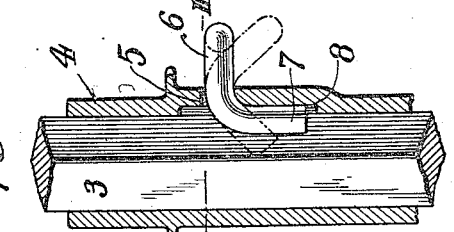
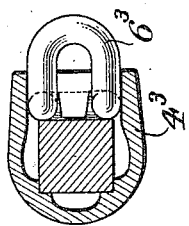
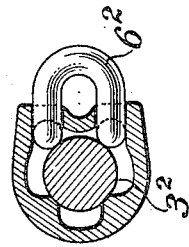
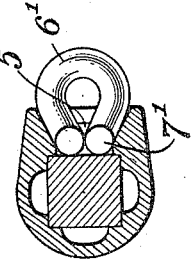
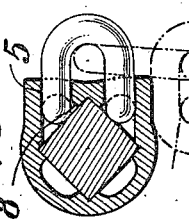
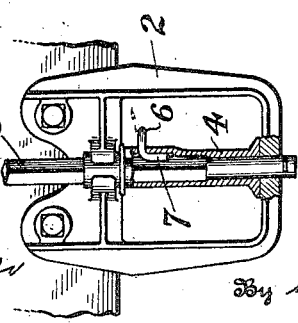
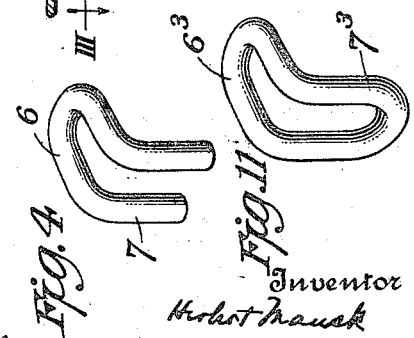
Witnesses:
Raphaël Netter
Inventor
Herbert Mausk
By his Attorney

UNITED STATES PATENT OFFICE.

HERBERT MAUSE, OF LAKEWOOD, OHIO, ASSIGNOR TO THE NATIONAL MALLEABLE CASTINGS COMPANY, OF CLEVELAND, OHIO, A CORPORATION OF OHIO.

HAND BRAKE MECHANISM.

1,155,328.

Specification of Letters Patent.

Patented Sept. 28, 1915.

Application filed July 14, 1915. Serial No. 39,742.

*To all whom it may concern:*

Be it known that I, HERBERT MAUSE, a citizen of the United States, residing at Lakewood, Cuyahoga county, Ohio, have invented new and useful Improvements in Hand Brake Mechanisms, of which the following is a specification, reference being had to the accompanying drawings, in which—

Figure 1 is an elevation, partly in section, showing a brake mechanism embodying my invention; Fig. 2 is an enlarged sectional view thereof; Fig. 3 is a section on lines III—III of Fig. 2, and Fig. 4 is a detail of the loop or link by which the brake chain is attached to the sleeve. In Fig. 5 I have shown in section a modified form of my invention, and Fig. 6 is a section on lines VI—VI of Fig. 5; Fig. 7 is a further modified form of my invention, and Fig. 8 is a section on lines VIII—VIII of Fig. 7; Fig. 9 is a further modification of my invention, Fig. 10 is a section on lines X—X thereof, and Fig. 11 is a detail of the link by which the brake chain is attached to the sleeve of Fig. 9.

My invention relates to hand-operated brake mechanisms and is intended to provide a mechanism for attaching the brake chain to the sleeve or chain-winding drum, which will not readily be broken, but if broken may easily be replaced.

Referring to the drawings, in which I have shown a brake mechanism of the type shown in the Coffin Patent No. 1,098,497, 9 is the frame or step, 3 is a brake shaft which I have shown to be of rectangular cross section, and 4 is the sleeve or chain-winding portion which surrounds the shaft 3 and rotates with it. Instead of having a lug cast on the side of the sleeve, I have shown the sleeve 4 having apertures 5 therein for reception of a link or loop 6, which has an extension 7, preferably at right angles to its body portion. The sleeve 4 is recessed internally at 8, to permit the right-angled portion 7 to occupy a position between the shaft 3 and the interior of the sleeve 4.

In assembling the device, one leg of the link 6 is first passed through the end link of the brake chain. The angled portion 7 of the link is then inserted through the apertures 5 in the sleeve, before the sleeve is applied to the shaft, and is turned downwardly to bring the angled portion 7 into bearing with the interior of the sleeve at its recessed portion 8. When the shaft has been passed through the sleeve the angled portion 7 is held in the recess 8 between the wall of the sleeve and the shaft, so that the link 6 cannot be removed while the shaft is in position.

In Figs. 5 and 6 I have shown a modification of my invention, in which the link 6' is inserted with its angled portion 7' extending upwardly, the sleeve 4' being recessed, to permit such insertion. In this form I have shown the single aperture 5' for insertion of the link, which bears against one side of the rectangularly-shaped shaft 3'. As in the preferred form, the link is held in position by the close fit of the link between the shaft and sleeve.

In Figs. 7 and 8 I have shown a further modification of my invention, in which the link 6² is designed for use with a shaft 3², round in cross section.

In Figs. 9, 10 and 11 I have shown a further modification of my invention, in which the securing mechanism consists of a chain link 6³ bent at right angles, so as to provide a suitable bearing between the shaft 3³ and sleeve 4³. The link 6³ is first welded to the brake chain as the end link thereof, and is thereafter applied to the sleeve 4³, and, when the shaft has been put in place, cannot work loose.

By the use of my invention I am enabled to eliminate the use of all separate pins, cotters or similar means for securing the chain to the sleeve or chain-winding portion. When the chain lug is made a part of the sleeve, as is shown in the Coffin Patent No. 1,098,497, the lug not infrequently breaks off, thus necessitating renewal of the whole sleeve, but if my improved lug or link breaks it can be readily or easily replaced without renewal of any other part.

The terms and expressions which I have employed are used as terms of description and not of limitation, and I have no intention, in the use of such terms and expressions, of excluding any mechanical equivalent for the features shown and described, but recognize that various modifications are possible within the scope of the invention claimed.

What I claim is:

1. In hand brake mechanism, a brake shaft, a sleeve on said shaft, and means for attaching a chain to the sleeve, said means consisting of a link having a portion extending into the interior of the sleeve and held thereagainst by the brake shaft.

2. In brake mechanism, a brake shaft, and a sleeve apertured for reception of the end link of a brake chain, a portion of said link being bent at an angle to the part of the link to which the chain is attached, said angled portion being held in the interior of the sleeve and in operative position by the brake shaft.

3. In hand brake mechanism, a brake shaft, and a sleeve rotatably connected with said shaft, said sleeve having an aperture for reception of an end link of the brake chain, said link having an angled portion adapted for insertion into said sleeve before the insertion of the brake shaft therein, and being adapted to be held in operative position within said sleeve by said brake shaft.

4. In brake mechanism, a brake shaft, and a sleeve apertured for reception of a brake chain securing member, said securing member being of U-shape and its ends having a bearing against the interior of the sleeve and being held thereagainst by the brake shaft.

HERBERT MAUSK.